United States Patent [19]
Izumi et al.

[11] Patent Number: 5,956,108
[45] Date of Patent: *Sep. 21, 1999

[54] MULTI-PANEL LCD DISPLAY WITH SOLID FILM BONDING LAYER AND METHOD OF MANUFACTURING SAME

[75] Inventors: Yoshihiro Izumi, Kashihara; Tokihiko Shinomiya, Nara, both of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/931,627

[22] Filed: Sep. 16, 1997

[30] Foreign Application Priority Data

Oct. 29, 1996 [JP] Japan ................................ 8-287121
May 15, 1997 [JP] Japan ................................ 9-125439

[51] Int. Cl.$^6$ .................................................. G02F 1/133
[52] U.S. Cl. ............................................................ 349/73
[58] Field of Search .................................................. 349/73

[56] References Cited

U.S. PATENT DOCUMENTS 5,106,197  4/1992  Ohuchida ............................... 349/73
5,729,317  3/1998  Izumi ..................................... 349/73

FOREIGN PATENT DOCUMENTS 08122769  5/1996  Japan.

*Primary Examiner*—William L. Sikes
*Assistant Examiner*—James Dudek
*Attorney, Agent, or Firm*—David G. Conlin, Esq.; Peter J. Manus, Esq.

[57] ABSTRACT

Liquid crystal panels are connected to one another with at least one thermoplastic bonding agent. The thermoplastic bonding agent has the same refractive index as the refractive index of two glass substrates respectively serving as a TFT substrate and a CF substrate forming each liquid crystal panel. The liquid crystal panels are heat-pressed to a reinforced substrate through the thermoplastic bonding film which is made of, for example, a thermoplastic polymer. According to this arrangement, the thermoplastic bonding film does not lose its volume when the liquid crystal panels are heat-pressed to the reinforced substrate. Thus, unlike a conventional method where the CF substrate forming the liquid crystal panel is pulled toward the reinforced substrate side, a uniform cell gap can be secured.

24 Claims, 13 Drawing Sheets

PARTIALLY SAPONIFIED COPOLYMER

DENATURED PARTIALLY SAPONIFIED COPOLYMER
(EXAMPLE 1)

DENATURED PARTIALLY SAPONIFIED COPOLYMER
(EXAMPLE 2)

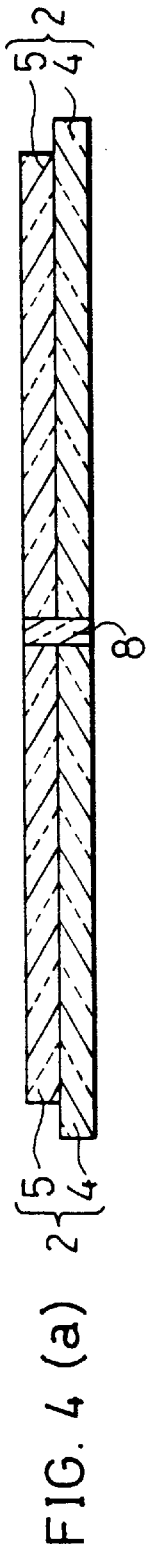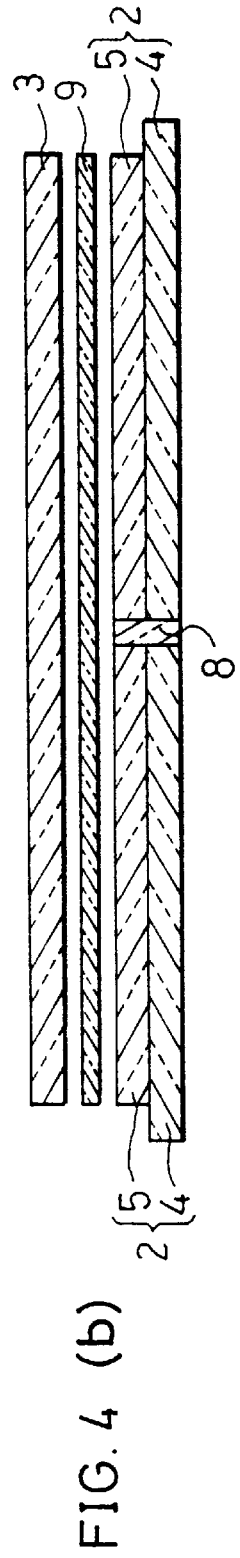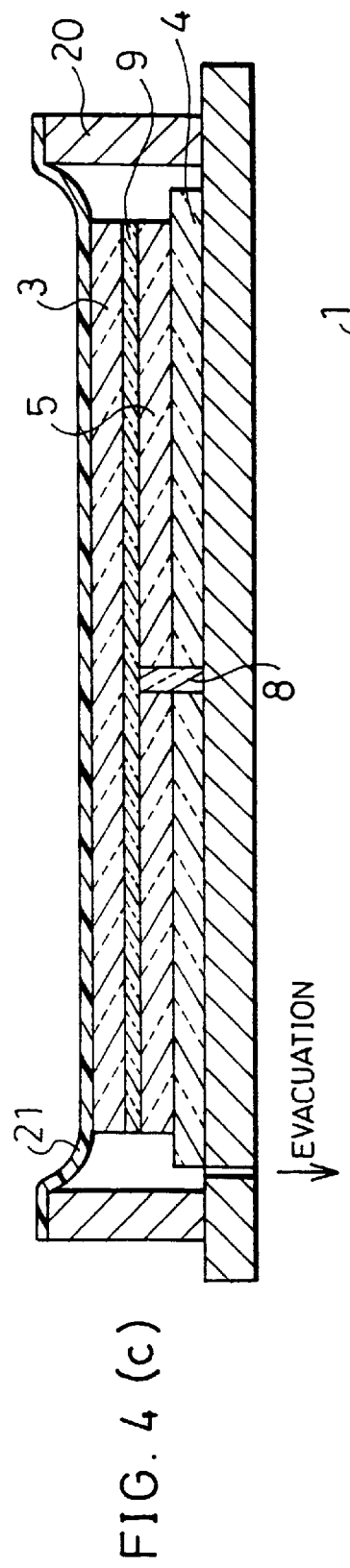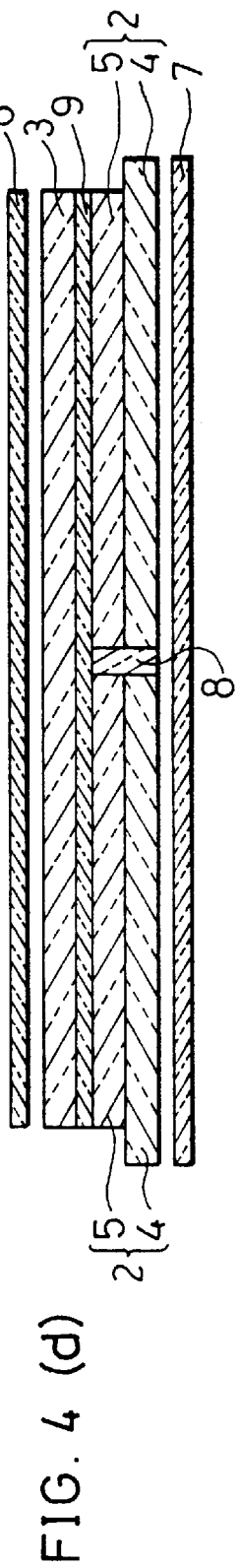
FIG. 4 (a)  FIG. 4 (b)  FIG. 4 (c)  FIG. 4 (d)

MULTI-PANEL LCD DISPLAY WITH SOLID FILM BONDING LAYER AND METHOD OF MANUFACTURING SAME

FIELD OF THE INVENTION

The present invention relates to a liquid crystal display device used for AV (Audiovisual) equipment or OA (Office Automation) equipment, and to a manufacturing method of the same.

BACKGROUND OF THE INVENTION

Various kinds of display devices, such as a home TV set, have been used as AV equipment or OA equipment. Examples of such display devices are a CRT (Cathode Ray Tube), a liquid crystal display device, a plasma display panel, an EL (Electroluminescent) display device, an LED (Light emitting Diode) display device, etc.

Recently, there has been an increasing demand for lighter, thinner, less power-consuming display devices with higher definition and a larger screen. Accordingly, display devices have been developed to meet the demand and some of them have been already put into practical use.

Of all the above display devices, the liquid crystal display device is particularly advantageous over the others. To be more specific, the liquid crystal display device has advantages that it has an extraordinary thin thickness (depth), consumes less power, and can display a full-color image. Because of these advantages, the liquid crystal display device is used in a wide variety of fields. Also, the liquid crystal display is expected to realize a display device with a large screen.

However, inconveniences, such as signal line disconnection and pixel defects, occur during the manufacturing process of the liquid crystal display device. The occurrence frequency of defective products is particularly high when manufacturing the liquid crystal display device with a large screen. As a necessary consequence, there is a problem that the price of the liquid crystal display device rises.

To solve the above problem, there has been proposed various types of liquid crystal display device adopting a multi-panel display method. More specifically, such a liquid crystal display device has a screen composed of a plurality of liquid crystal panels connected to one another. According to this arrangement, the screen of the liquid crystal display device can be enlarged.

However, according to the above arrangement, the joints connecting the liquid crystal panels, namely, the connection between the liquid crystal panels, become more noticeable, because light emanated from the back-light leaks through a space made in the joints. Therefore, to realize a liquid crystal display device capable of displaying a natural image on a large screen, a technique to make the joints unnoticeable must be developed.

Accordingly, the Applicant of the present invention proposes a new liquid crystal display device adopting the multi-panel display method in Japanese Laid-open Patent Application No. 122769/1996 (Tokukaihei 8-122769). FIG. 11 is a plan view schematically showing an arrangement of a liquid crystal display device 51 disclosed in the above publication. FIG. 12 is a cross section taken on line X—X in FIG. 11.

The liquid crystal display device 51 actually includes a plurality of active matrix type liquid crystal panels 52; however, assume that the liquid crystal 51 includes two liquid crystal panels 52 herein for the explanation's convenience.

Each liquid crystal panel 52 includes a TFT substrate and a CF substrate 54, both of which are transparent glass substrates. Although it is not illustrated in the drawing, a matrix of thin film transistors are placed on the TFT substrate 53, and a matrix of color filters 54a are placed on the CF substrate 54, whereby the liquid crystal display panel 52 is assembled as an active matrix type color liquid crystal panel. In addition, a black matrix 54b is placed on the CF substrate 54 to separate the pixels.

The TFT substrate 53 and CF substrate 54 are bonded to each other through a seal portion 55 which is provided along the circumferences of the TFT substrate 53 and CF substrate 54. A liquid crystal 56 is sealed airtight in a space between the TFT substrate 53 and CF substrate 54.

Both the liquid crystal panels 52 are laminated to a large reinforced substrate 57 with a bonding agent 58. Also, the liquid crystal panels 52 are connected to each other with the same bonding agent 58. In other words, the liquid crystal panels 52 are connected to each other adjacently on the same plane.

The bonding agent 58 is, for example, a UV-set bonding agent which is set when irradiated by UV rays. The bonding agent 58 has the same refractive index as the refractive index of the two glass substrate serving as the TFT substrate 53 and CF substrate 54 respectively. Thus, light passing through the joint is not refracted, reflected, nor scattered, thereby making the joint unnoticeable.

The outer surface of the reinforced substrate 57 (the side across where the liquid crystal 56 is sealed in) is covered with a polarizing plate (polarizer) 59 almost entirely. Likewise, the outer surfaces of both the liquid crystal panels 52 are covered with a polarizing plate (polarizer) 60 almost entirely. Here, the polarizing axes of the polarizing plates 59 and 60 intersect with each other at right angles.

Although it is not illustrated, a back-light composed of a cold cathode tube or the like is provided to the outer surface side of the polarizing plate 60, in other words, behind the liquid crystal display device 51 (lower half side in FIG. 12), and a driver for controlling an image signal is connected to each liquid crystal panel 52. Each liquid crystal panel 52 modulates light emanated from the back-light in accordance with image information to enable the observer to see the image information inputted therein.

Next, a manufacturing method of the liquid crystal display device 51 will be explained. FIGS. 13(a) through 13(d) are cross sections showing the manufacturing process of the liquid crystal display device 51.

As shown in FIG. 13(a), to begin with, a large quantity of the bonding agent 58 having a low viscosity of about 100–500 cP is applied to both the entire main surfaces of the liquid crystal panels 52 and a space between the liquid crystal panels 52. Then, as shown in FIG. 13(b), the reinforced substrate 57 is laminated to the liquid crystal panels 52. Here, the reinforced substrate 57 is laminated to the liquid crystal panels 52 from the edge gradually so as to be laminated firmly without trapping the bubbles under the bonding surface.

Then, as shown in FIG. 13(c), an excessive bonding agent 58a overflown from the spaces between the liquid crystal panels 52 and reinforced substrate 57 is removed. Then, as shown in FIG. 13(d), UV-rays are irradiated to the bonding agent 58 from the outer surface side of the reinforced substrate 57 to set the bonding agent 58.

However, the above prior art has four following problems.

① The UV-set bonding agent 58 loses 5–10% of its volume when it is set. Thus, if the liquid crystal panels 52 are bonded to the reinforced substrate 57 through the bonding agent 58, the CF substrate 54 is pulled toward the reinforced substrate 57 side. Consequently, a cell gap of the liquid crystal panels 52 (thickness of the liquid crystal layer) varies, thereby making it impossible to obtain satisfactory display characteristics.

② To laminate the liquid crystal panels 52 to the reinforced substrate 57 firmly and uniformly, the bonding agent 58 is overflown intendedly from the space between the liquid crystal panels 52 and reinforced substrate 57 when the liquid crystal panels 52 and reinforced substrate 57 are bonded to each other. Thus, although a large quantity of the bonding agent 58 is used, only 1/10 or less of which is set in practice, and the rest, that is, 9/10 or more, of the used bonding agent 58 is wasted or recycled. In other words, a considerable quantity of the bonding agent 58 is wasted, thereby increasing the manufacturing cost and hence the price of the liquid crystal display device 51.

③ When a pair of the liquid crystal panels 52 are bonded to each other in the manufacturing process of the liquid crystal display device 51, the excessive bonding agent 58a overflows to the periphery from the space between the liquid crystal panels 52 and reinforced substrate 57. Thus, besides a step of removing the overflown bonding agent 58a, the excessive bonding agent 58a adhering to the liquid crystal panels 52 and reinforced substrate 57 should be removed in another step. This keeps the workability quite low, and as a consequence, not only the throughput is reduced, but also the mass productivity remains quite low when the liquid crystal display device 51 is manufactured.

④ The liquid crystal panels 52, and the liquid crystal display panels 52 and reinforced substrate 57 are bonded to each other concurrently through the same bonding agent 58. Thus, if a defect, such as a crack, occurs at a portion in the joint of the liquid crystal panels 52, it is difficult to rework (remove) the defective portion.

SUMMARY OF THE INVENTION

It is therefore a first object of the present invention to provide a liquid crystal display device adopting a multi-panel display method and having a uniform cell gap and satisfactory display characteristics. Also, it is a second object of the present invention to provide a manufacturing method of a liquid crystal display device which can reduce the manufacturing costs and price of the device while improving the workability, throughput, and mass productivity.

To fulfill the first object, a liquid crystal display device of the present invention is characterized by being furnished with: a plurality of liquid crystal panels; and a reinforced substrate to which the liquid crystal panels are laminated to be connected to one another adjacently on a same plane, and the liquid crystal panels are heat-pressed to the reinforced substrate through a bonding film.

According to the above arrangement, a plurality of the liquid crystal panels are laminated to the reinforced substrate, whereby the liquid crystal panels are connected to one another adjacently on the same plane. Here, the liquid crystal panels are heat-pressed to the reinforced substrate through the bonding film, which is made of, for example, a thermoplastic polymer. Thus, the bonding film does not lose its volume when the liquid crystal panels are heat-pressed to the reinforced substrate.

More specifically, in the conventional method, the liquid crystal panels are heat-pressed to the reinforced substrate through, for example, a UV-set bonding agent. The bonding agent loses 5–10% of its volume when it is set. Thus, when the liquid crystal panels are laminated to the reinforced substrate through the bonding agent, a part of the liquid crystal panels (for example, the substrate having formed thereon a color filter) is pulled toward the reinforced substrate side. Consequently, the cell gap of the liquid crystal panels varies, thereby deteriorating the display characteristics.

However, the above bonding film does not lose its volume as does the bonding agent. Therefore, when the liquid crystal panels are laminated to the reinforced substrate through the bonding film, a part of the liquid crystal panels is not pulled toward the reinforced substrate side. Thus, according to the above arrangement, it has become possible to maintain a uniform cell gap of the liquid crystal panels. Consequently, a liquid crystal display device adopting a multi-panel display method and having a large screen and satisfactory display characteristics can be obtained.

Also, to fulfill the second object, a manufacturing method of a liquid crystal display device of the present invention is characterized by being composed of:

a first step of placing a bonding film, which has a size as large as bonding areas of a plurality of liquid crystal panels and a reinforced substrate, between the liquid crystal panels and reinforced substrate; and a second step of heat-pressing the liquid crystal panels to the reinforced substrate, so that the liquid crystal panels are connected to one another adjacently and placed on a same plane.

According to the above arrangement, the bonding film is placed between a plurality of the liquid crystal panels and the reinforced substrate, and the liquid crystal panels are heat-pressed to the reinforced substrate through the boding film. Consequently, the liquid crystal panels are connected to one another adjacently on the same plane.

Here, the bonding film has a size substantially as large as the bonding areas of the liquid crystal panels and reinforced substrate. Thus, when the liquid crystal panels are heat-pressed to the reinforced substrate, the bonding film is fully used without being wasted (in the conventional manner, a large quantity of the bonding agent is used, and an excessive bonding agent overflows from a space between the liquid crystal panels and reinforced substrate, thereby wasting a considerable quantity of the bonding agent).

Thus, according to the above arrangement, the bonding film can be used efficiently, and for this reason, not only the manufacturing costs, but also the price of the device can be reduced.

Also, unlike the conventional method where an excessive bonding agent overflows to the periphery from the space between the liquid crystal panels and reinforced substrate, a step of removing the overflown excessive bonding agent or a step of removing the excessive bonding agent adhering to the liquid crystal panels and reinforced substrate can be omitted. Thus, according to the above arrangement, the workability during the manufacturing process of the device can be improved, and therefore, the mass productivity of the device can be enhanced by improving the throughput.

For a fuller understanding of the nature and advantages of the invention, reference should be made to the ensuing detailed description taken in conjunction with the accompanying drawings.

BRIEF DESCRIPTION OF THE DRAWINGS

FIGS. 4(a) through 4(d) are cross sections explaining a manufacturing process of the above liquid crystal display device;

DESCRIPTION OF THE EMBODIMENTS

Embodiment 1

Referring to FIGS. 1 through 8, the following description will describe an example embodiment of the present invention.

Figure 1:
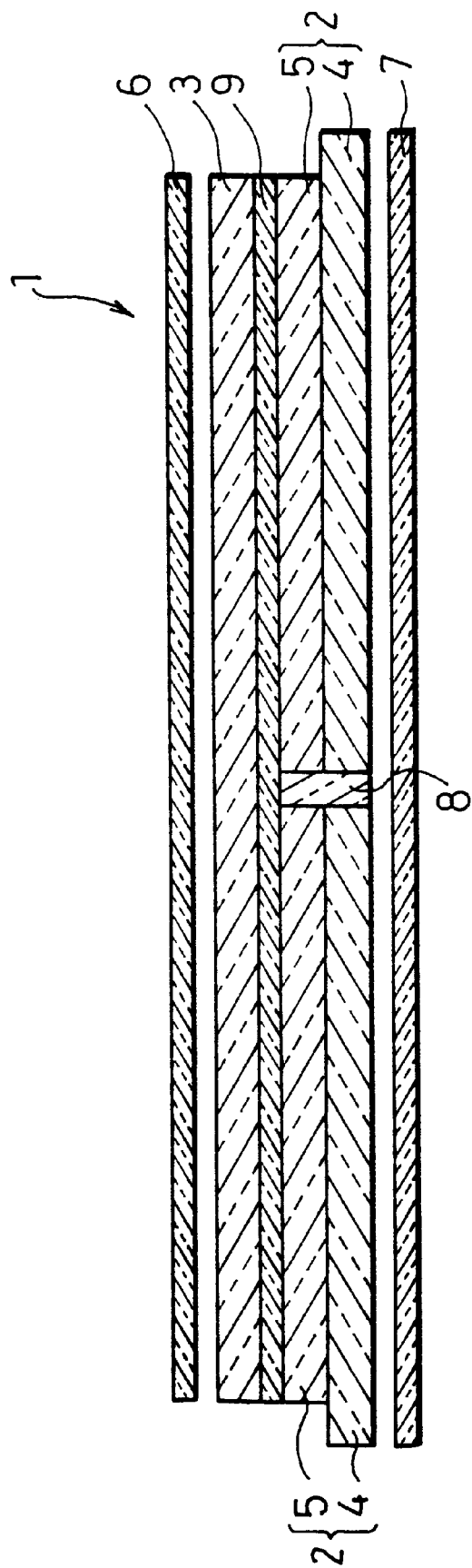
FIG. 1 is a cross section showing an example arrangement of a liquid crystal display device of the present invention adopting a multi-panel display method.

FIG. 1 is a cross section showing a schematic arrangement of a direct-view-type liquid crystal display device 1 of the present embodiment. The liquid crystal display device 1 actually includes a plurality of active matrix type liquid crystal panels 2; however, assume that the liquid crystal 1 includes two liquid crystal panels 2 herein for the explanation's convenience. Each liquid crystal panel 2 is a typical model having thin film transistors (hereinafter, referred to as TFTs) as active elements.

Figure 11:
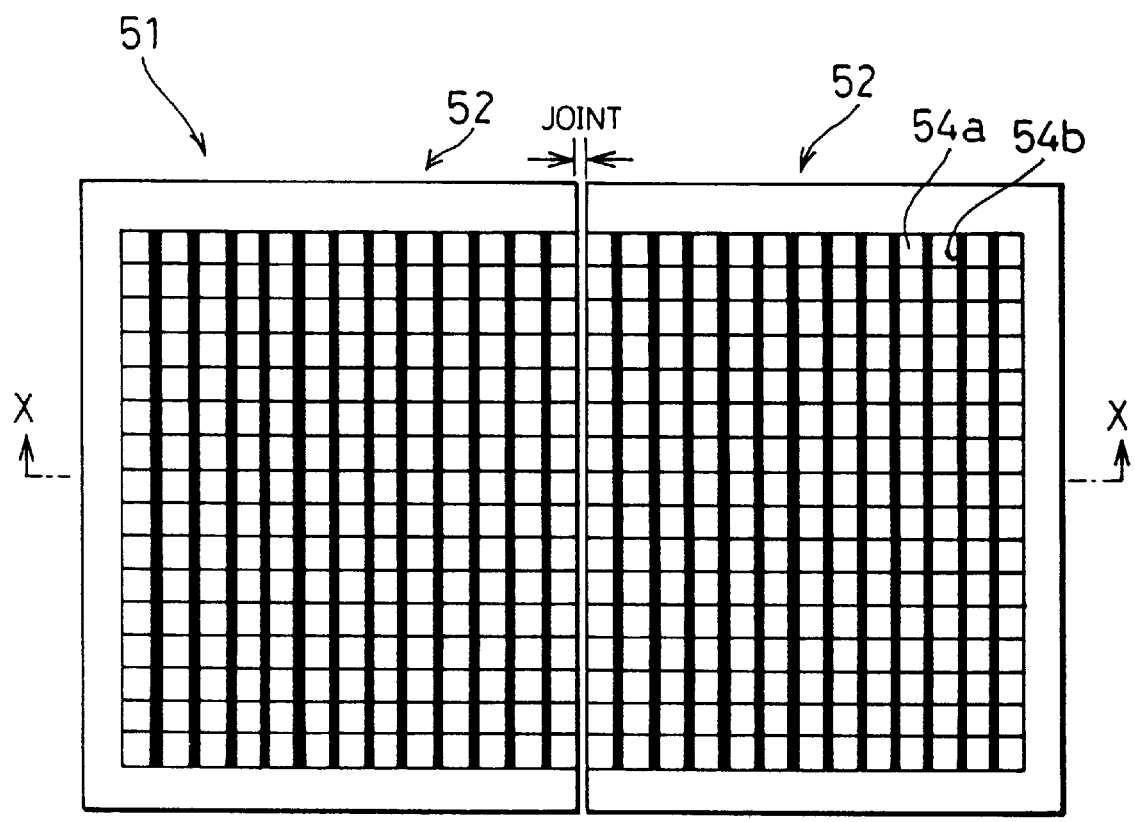
FIG. 11 is a plan view showing a schematic arrangement of a conventional liquid crystal display device.
Figure 12:
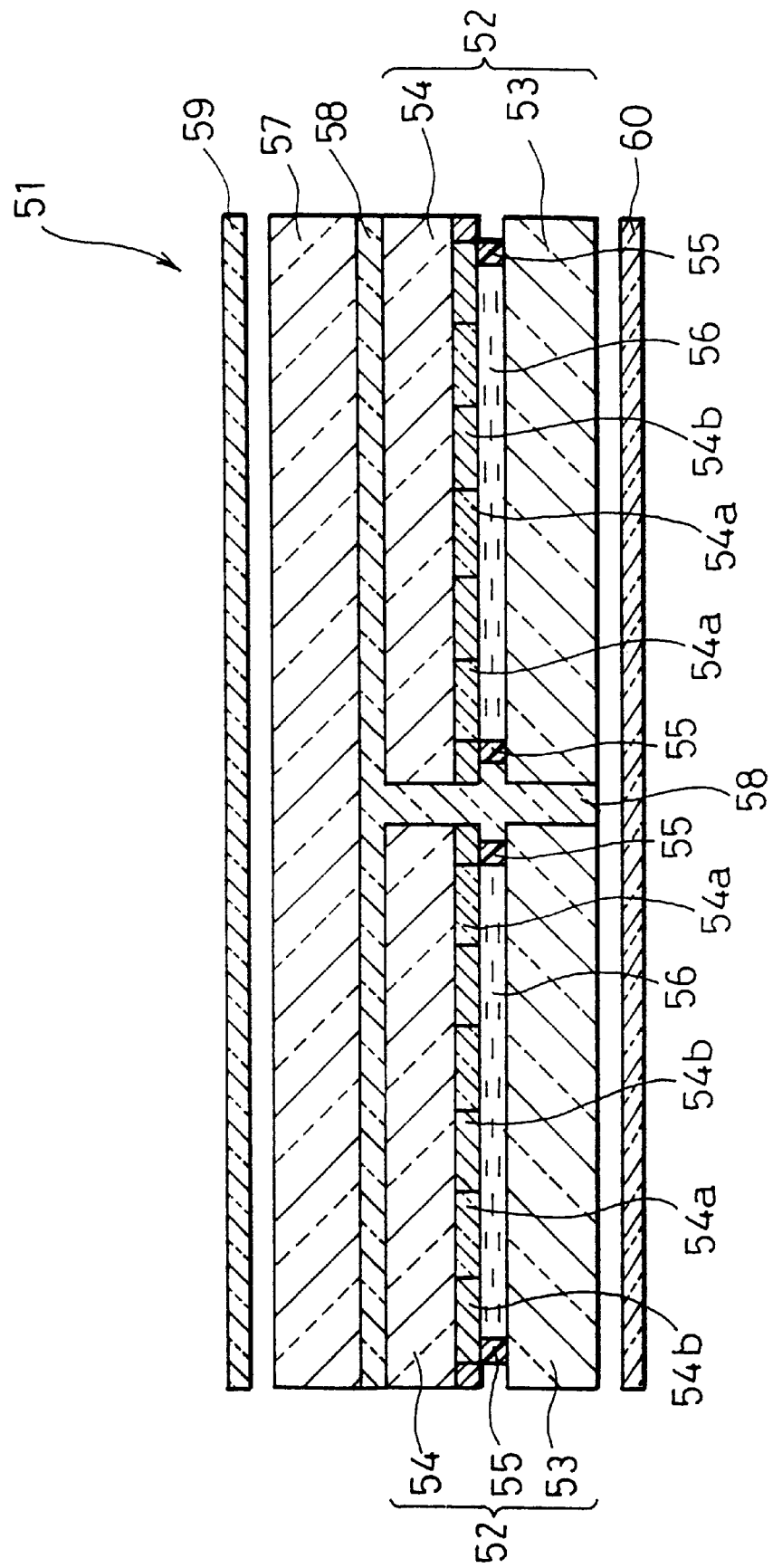
FIG. 12 is a cross section showing a schematic arrangement of the above liquid crystal display device.
Figure 13A:
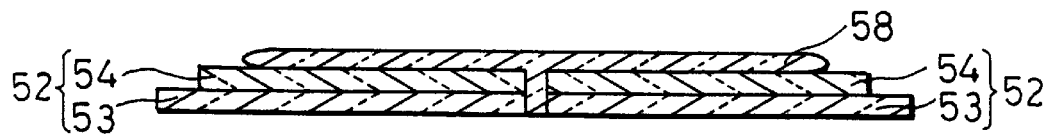
FIGS. 13(a) through 13(d) are cross sections showing a manufacturing process of the above liquid crystal display device.
Figure 13B:
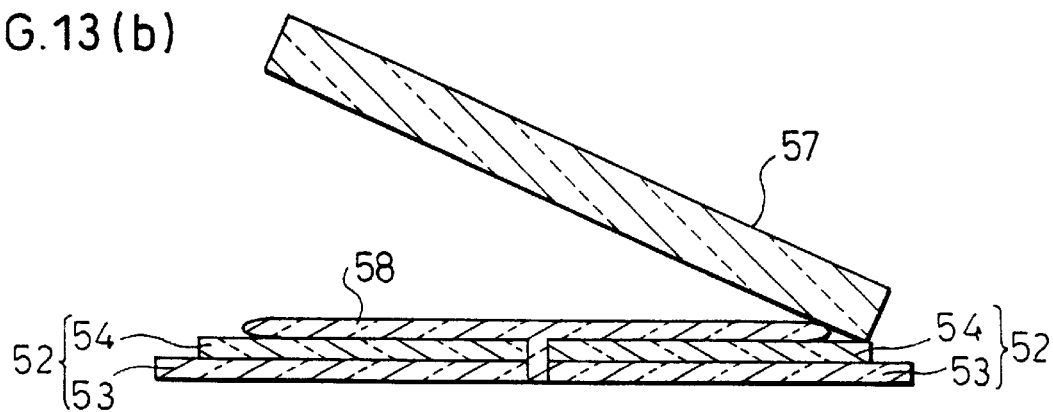
Figure 13C:
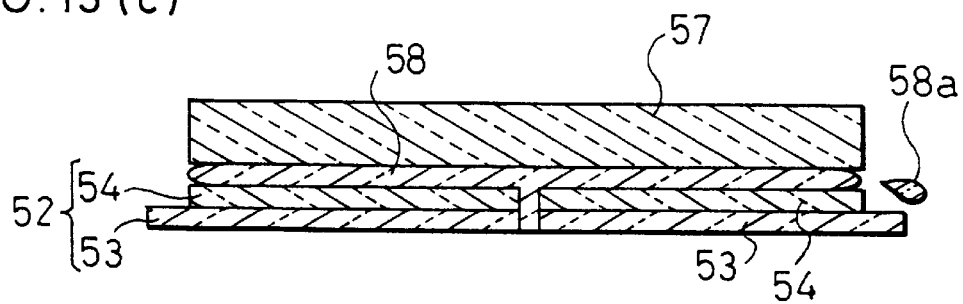
Figure 13D:
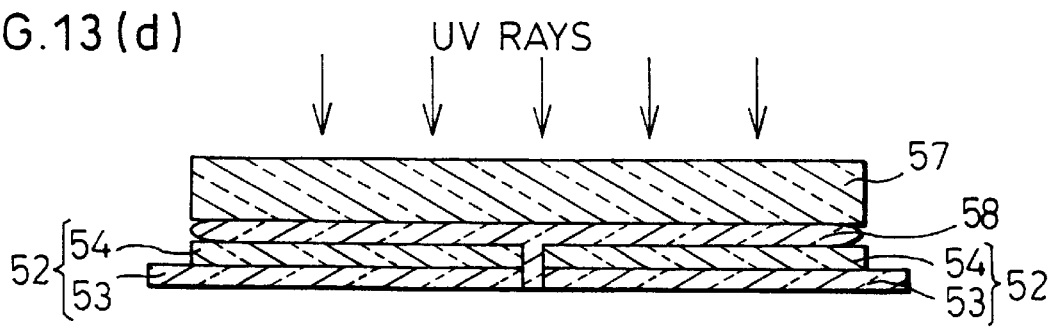

The liquid crystal panels 2 are connected to each other through a bonding agent 8 serving as a refractive index adjusting agent, an explanation of which will be given below. Also, both the liquid crystal panels 2 are heat-pressed to a large reinforced substrate 3 through a bonding film 9, an explanation of which will be also given below. In other words, the reinforced substrate 3 is laminated to both the liquid crystal panels 2, so that the liquid crystal panels 2 are connected to each other adjacently on the same plane. The pixels are aligned on the liquid crystal panels 2 connected to each other adjacently in the conventional manner as is illustrated in FIG. 11. Also, the reinforced substrate 3 is a glass substrate having substantially the same thermal expansion coefficient as the liquid crystal panels 2.

Each liquid crystal panel 2 includes a TFT substrate 4 and a CF substrate 5, both of which are transparent glass substrates. Although it is not shown in the drawing, a matrix of TFTs are placed on the TFT substrate 4, while a matrix of color filters are placed on the CF substrate 5, whereby the liquid crystal panel 2 is assembled as an active matrix type color liquid crystal panel. In addition, an unillustrated black matrix is placed on the CF substrate 5 to separate the pixels.

The TFT substrate 4 and CF substrate 5 are bonded to each other through an unillustrated seal portion provided along the circumferences of the TFT substrate 4 and CF substrate 5. Also, an unillustrated liquid crystal is sealed airtight in a space between the TFT substrate 4 and CF substrate 5.

A polarizing plate (polarizer) 6 is provided to the outer surface of the reinforced substrate 3 almost entirely. Likewise, a polarizing plate (polarizer) 7 is provided to the outer surfaces of the liquid crystal panels 2 almost entirely. Here, the polarizing axes of the polarizing plates 6 and 7 intersect with each other at right angles. According to this arrangement, even if light emanated from a back-light, which will be described below, leaks through the joint of the liquid crystal panels 2, the polarizing plates 6 and 7 placed in the crossed Nicols state makes the joint appear in black, thereby making the joint unnoticeable.

Although it is not shown in the drawing, the back-light composed of a cool cathode tube or the like is provided in the outer surface side of the polarizing plate 7, namely, behind the liquid crystal display device 1 (half lower side in FIG. 1), and a driver for controlling an image signal is provided to each liquid crystal panel 2. Each liquid crystal panel 2 modulates light emanated from the back-light in accordance with image information to enable the observer to see the image information inputted therein.

The bonding agent 8 is, for example, a UV-set bonding agent which is set when irradiated by UV rays. The bonding agent 8 has the same refractive index as the refractive index of the two glass substrates serving as the TFT substrate 4 and CF substrate 5, respectively. More specifically, let n be a refractive index of the two glass substrates, then a refractive index of the bonding agent 8 is $n \pm 0.01n$. For example, when the two glass substrates are made of barium borosilicate glass 7059 of Corning Inc., a bonding agent having a refractive index of 1.53 is suitable as the bonding agent 8. According to the above arrangement, light passing through the joint is not refracted, reflected, nor scattered, thereby making the joint unnoticeable.

In other words, whether the connection between the liquid panels 2 becomes noticeable or not largely depends on the refractive index of a material filled in a space between the liquid crystal panels 2. In the above arrangement, the liquid crystal panels 2 are connected to each other with the bonding agent 8 having the same refractive index as the refractive index of the two glass substrates serving as the TFT substrate 4 and CF substrate 5, respectively. Accordingly, light passing through the joint of the liquid crystal panels 2 and light passing through the liquid crystal panels 2 are refracted at substantially the same refractive index. Consequently, the above arrangement can make the connection between the liquid crystal panels 2 unnoticeable, thereby improving the display characteristics of the device.

If the bonding agent 8 has the same refractive index as the refractive index of the TFT substrate 4 and CF substrate 5 forming each liquid crystal panel 2, the bonding film 9 does not necessarily have the same refractive index as the refractive index of the above two substrates. Therefore, according to the above arrangement, since the refractive index of the bonding film 9 is not especially limited, the range of choices for the bonding films 9 can be extended.

The bonding film 9 is a film made of, for example, a thermoplastic polymer. When the bonding film 9 made of the thermal plastic polymer is heated, the bonding film 9 is fused, whereupon the bonding property is attained.

Figure 2A:
FIG. 2(a) is a view explaining a molecular structure of a typical partially saponified copolymer of ethylene-vinyl acetate.
Figure 2B:
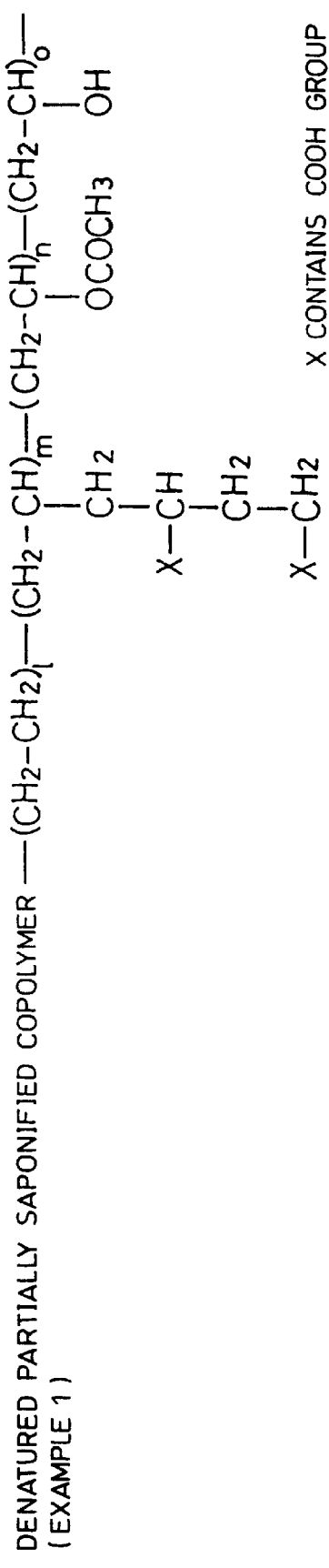
FIGS. 2(b) and 2(c) are views explaining molecular structures of typical denatured partially saponified copolymer of ethylene-vinyl acetate.
Figure 2C:
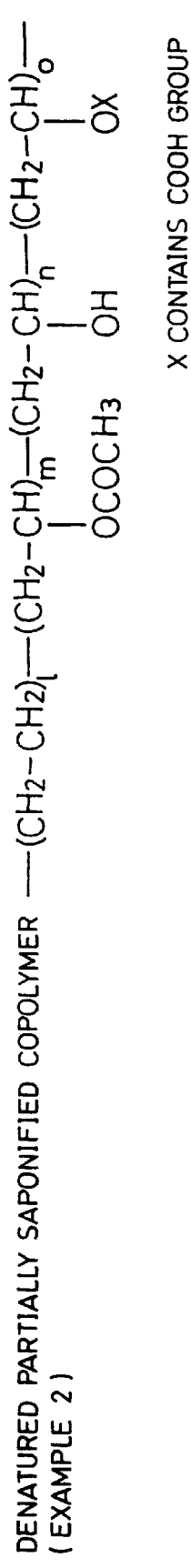

The bonding film 9 is preferably a film of a partially saponified or denatured partially saponified copolymer of ethylene-vinyl acetate (EVA) shown in FIGS. 2(*a*) through 2(*c*). In the drawing, each of small letters 1, m, and n represent a natural number. In this case, the liquid crystal panels 2 are laminated to the reinforced substrate 3 at a relatively low temperature of 90–100° C. through vacuum heat-pressuring, for example. Consequently, a satisfactory bonding property can be attained, and for this reason, the liquid crystal panels 2 excel the others relatively in terms of reliability.

Figure 3:
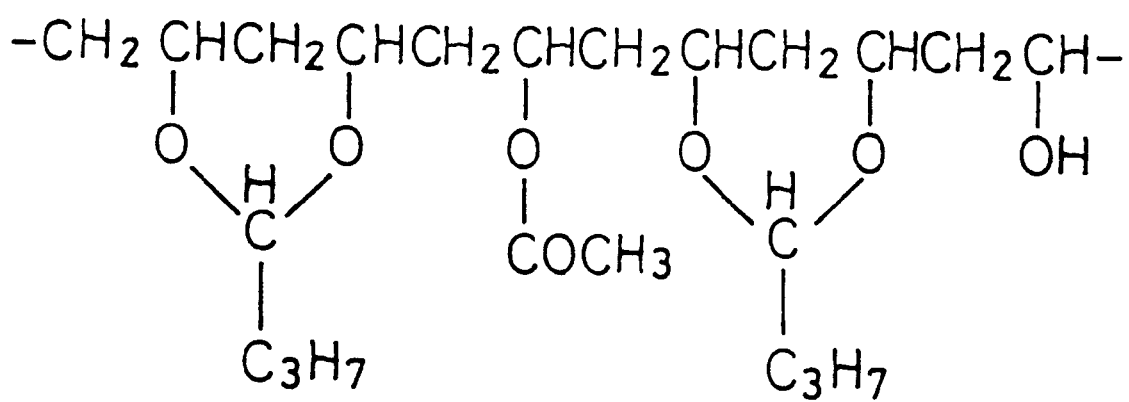
FIG. 3 is a view explaining a typical molecular structure of polyvinylbutyral.

Alternatively, the bonding film 9 may be a film mainly made of polyvinylbutyral (PVB) as shown in FIG. 3. Since polyvinylbutyral is a non-crystal polymer, the bonding film 9 made of polyvinylbutyral has a small retardation Δnd of up to 17 nm. More specifically, polyvinylbutyral of 380 μm thick can attain a retardation Δnd of as small as 5 nm. The retardation Δnd referred herein is a phase difference between two beams of light out of those passing through the bonding film 9 having different polarizing directions. When the retardation Δnd is 17 nm or less, the polarizing characteristics of the light passing through the bonding film 9 do not deteriorate considerably because of the following reasons.

In general, when a pair of polarizing plates (polarizers) are set in the crossed Nicols state, an amount of passing light is reduced to 0, and the passing light appears in black. However, if there is a substance having the birefringence between the pair of polarizing plates, the polarization state is disturbed by the birefringence property, and light starts to leak. Here, a light leaking degree (light transmittance) T (%) is expressed as:

$$T = \sin^2(\pi \Delta nd/\lambda).$$

The active matrix type liquid crystal display device generally has a display contrast of 100 or higher. Thus, if the light leaking degree T is 1% or less, the liquid crystal display device can maintain a contrast of 100 or higher, at which the observer can see the black state naturally.

A correlation between the birefringence and light leaking degree T of green light (λ–550 nm) as an example typical visible ray is set forth in Table 1 below.

TABLE 1

| BIREFRINGENCE Δnd (nm) | LIGHT LEAKING DEGREE T (%) OF LIGHT HAVING λ = 550 (nm) |
|---|---|
| 0 | 0.000 |
| 1 | 0.003 |
| 2 | 0.013 |
| 3 | 0.029 |
| 4 | 0.052 |
| 5 | 0.082 |
| 6 | 0.117 |
| 7 | 0.160 |
| 8 | 0.209 |
| 9 | 0.264 |
| 10 | 0.326 |
| 11 | 0.394 |
| 12 | 0.469 |
| 13 | 0.550 |
| 14 | 0.638 |
| 15 | 0.732 |
| 16 | 0.833 |
| 17 | 0.940 |
| 18 | 1.053 |

TABLE 1-continued

| BIREFRINGENCE Δnd (nm) | LIGHT LEAKING DEGREE T (%) OF LIGHT HAVING λ = 550 (nm) |
|---|---|
| 19 | 1.173 |
| 20 | 1.299 |

Table 1 reveals that when the retardation Δnd is 17 nm or less, the light leaking degree T is maintained at 1% or less. In other words, when the retardation Δnd is 17 nm or less, the polarizing characteristics of passing light does not deteriorate considerably even if there is a substance having the birefringence between the pair of polarizing plates, and therefore, no adverse effect is given to the display. For this reason, the bonding film 9 used in the present embodiment is arranged to have the retardation Δnd of 17 nm or less, thereby making it possible to attain satisfactory display characteristics.

Note that the material forming the bonding film 9 is not limited to the aforementioned material. The bonding film 9 may be made of any other material as long as the material does not give any adverse effect to the reliability and display characteristics of the liquid crystal panels 2. In other words, only if the bonding film 9 is made of a material having the retardation Δnd of 17 nm or less, the display characteristics of the liquid crystal display device 1 can be improved.

Next, a manufacturing method of the liquid crystal display device 1 of the present embodiment will be explained. FIGS. 4(*a*) through 4(*d*) are cross sections showing the manufacturing process of the liquid crystal display device 1.

As shown in FIG. 4(*a*), to begin with, two active matrix type liquid crystal panels 2 are prepared, and the liquid crystal panels 2 are connected to each other with the bonding agent 8 at their opposing end surfaces. The bonding agent 8 is, for example, a UV-set bonding agent. Also, the bonding agent 8 has the same refractive index as the refractive index of the two glass substrates serving as the TFT substrate 4 and CF substrate 5, respectively. The pixels are aligned on the liquid crystal panels 2 connected to each other adjacently in the conventional manner as is illustrated in FIG. 11.

If bubbles are trapped in the bonding agent 8 between the liquid crystal panels 2 at this point, light reflects at the interface between the bubbles and bonding agent 8, which makes the joint of the liquid crystal panels 2 noticeable. However, this problem can be eliminated easily by fusing the bonding agent 8 with a solvent and wiping off the fused bonding agent 8 before it is set.

Then, as shown in FIG. 4(*b*), the bonding film 9 is placed between the liquid crystal panels 2 and the single large reinforced substrate 3. As previously mentioned, the bonding film 9 is a film mainly made of a partially saponified or denatured partially saponified copolymer of ethylene-vinyl acetate (EVA) or polyvinylbutyral. The bonding film 9 is of a size substantially as large as the bonding areas of the liquid crystal panels 2 and reinforced substrate 3. The reinforced substrate 3 used in the present embodiment measures 28 inches from the upper left corner to the lower right corner.

Next, as shown in FIG. 4(*c*), the work assembled in the step shown in FIG. 4(*b*) is set in a vacuum (decompress) pressing apparatus 20 having a film 21. Subsequently, the vacuum heat-pressing is carried out. To be more specific, the pressure inside the vacuum (decompress) pressing apparatus 20 is reduced to 1–100 torr, preferably to 30 torr, and the work is heated for 30 minutes at 95° C. The work can be heated easily if the vacuum (decompress) pressing apparatus 20 is set in an oven or the like. Alternatively, the work can be also heated easily if a heater is implanted in the framework inside the vacuum (decompress) pressing apparatus 20.

The vacuum (decompress) pressing apparatus 20 is a device which can place the subject work under a vacuum (decompressing) atmosphere and press the same using air pressure. Using the vacuum (decompress) pressing apparatus 20 makes it possible to laminate the liquid crystal panels 2 to the reinforced substrate 3 without trapping the bubbles under their respective bonding surfaces.

Then, as shown in Figure (d), the work is taken out from the vacuum (decompress) pressing apparatus 20. Subsequently, the polarizing plate 6 is provided to the outer surface of the reinforced substrate 3 almost entirely, while the polarizing plate 7 is provided to the outer surfaces of the liquid crystal panels 2 almost entirely, whereby the liquid crystal display device 1 is assembled.

Incidentally, a partially saponified or denatured partially saponified copolymer of ethylene-vinyl acetate (EVA) is a crystalline polymer which is characterized by having strong birefringence. This characteristic is not preferable for the liquid crystal display device 1 which displays an image by exploiting the polarizing characteristics of light.

Thus, when the bonding film 9 is made of the crystalline polymer, the bonding film 9 is cooled abruptly after the liquid crystal panels 2 are vacuum heat-pressed to the reinforced substrate 3. Because by so doing, the crystallinity of the crystalline polymer is disturbed, and as a consequence, the retardation Δnd is reduced to 17 nm or less, thereby making the birefringence negligible to the display. Thus, the liquid crystal panels 2 excel the others relatively in terms of reliability.

Also, when the bonding film 9 is made of a non-crystal polymer, such as polyvinylbutyral, it is preferable to heat the bonding film 9 at 100° C. or above. Because by so doing, the liquid crystal panels 2 and reinforced substrate 3 are bonded to each other through the bonding film 9 in a reliable manner. Thus, of all the members forming each liquid crystal panels 2, those made of UV-set resin must have resistance to heat of 100° C. or above. Example of such members are the seal portion for sealing the liquid crystal material airtight inside the liquid crystal panels 2, an unillustrated liquid crystal inlet sealing portion, etc.

As has been explained, the liquid crystal display device 1 of the present embodiment includes the liquid crystal panels 2 and reinforced substrate 3 to which the liquid crystal panels 2 are laminated so as to be connected to each other adjacently on the same plane, and the liquid crystal panels 2 are heat-pressed to the reinforced substrate 3 through the bonding film 9.

According to the above arrangement, the bonding film 9 does not lose its volume when the liquid crystal panels 2 are heat-pressed to the reinforced substrate 3.

In other words, in the conventional method, the liquid crystal panels 2 are heat-pressed to the reinforced substrate 3 through, for example, the UV-set bonding agent 8 which loses 5–10% of its volume when being set. Thus, a part (for example, CF substrate 5) of the liquid crystal panels 2 is pulled toward the reinforced substrate 3 side when the liquid crystal panels 2 are laminated to the reinforced substrate 3. Consequently, the cell gap of the liquid crystal panels 2 varies, thereby deteriorating the display characteristics.

However, the above-explained bonding film 9 does not lose its volume. Thus, a part of the liquid crystal panels 2 is not pulled toward the reinforced substrate 3 when the liquid crystal panels are laminated to the reinforced substrate 3 through the bonding film 9. Consequently, according to the above arrangement, a cell gap of the liquid crystal panels 2 can be maintained uniformly. Thus, it has become possible to obtain the liquid crystal display device 1 adopting the multi-panel display method and having a large screen and satisfactory display characteristics.

The manufacturing method of the liquid crystal display device 1 of the present embodiment is composed of two steps:

the first step of placing the bonding film 9, which has a size substantially as large as the bonding areas of the liquid crystal panels 2 and reinforced substrate 3, between the liquid crystal panels 2 and reinforced substrate 3; and the second step of heat-pressing the liquid crystal panels 2 to the reinforced substrate 3, so that the liquid crystal panels 2 are connected to each other adjacently on the same plane.

According to the above arrangement, the bonding film 9 is of a size which is substantially as large as the bonding areas of the liquid crystal panels 2 and reinforced substrate 3. Thus, the bonding film 9 is fully used without being wasted when the liquid crystal panels 2 are heat-pressed to the reinforced substrate 3 (as previously explained, a large quantity of the bonding agent is used in the conventional method; moreover, an excessive bonding agent overflows from the space between the liquid crystal panels and reinforced substrate, thereby wasting a considerable quantity of the bonding agent).

Since the above arrangement makes it possible to use the bonding film 9 efficiently, not only the manufacturing costs, but also the price of the device can be reduced.

Also, according to the above arrangement, no excessive bonding agent overflows to the periphery. Thus, a step of removing the excessive overflown bonding agent, or a step of removing the excessive bonding agent adhering to the liquid crystal panels or reinforced substrate can be omitted. Therefore, according to the above arrangement, the workability during the manufacturing process can be improved, and as a consequence, the mass productivity of the device can be enhanced by improving the throughput.

In the present embodiment, after the liquid crystal panels are connected to each other with the bonding agent 8 at their respective end surfaces, the bonding film 9 is placed between the liquid crystal panels 2 and reinforced substrate 3. Thus, if bubbles are trapped in the bonding agent 8 while the liquid crystal panels 2 are connected together, or a defect, such as crack, occurs in the joint, the defective portion can be corrected before the bonding film 9 is placed. In short, the defective portion can be corrected efficiently.

Also, in the present embodiment, since the liquid crystal panels 2 are heat-pressed to the reinforced substrate 3 under a vacuum or decompressing condition, the air pressure is always applied to the liquid crystal panels 2. Thus, the liquid crystal panels 2 are bonded to the reinforced substrate 3 while being fixed at a predetermined cell gap, so that the cell gap of the liquid crystal panels 2 does not vary. Consequently, according to the above arrangement, it has become possible to maintain a uniform cell gap of the liquid crystal panels 2, thereby obtaining the liquid crystal display device 1 having satisfactory display characteristics.

Figure 5A:
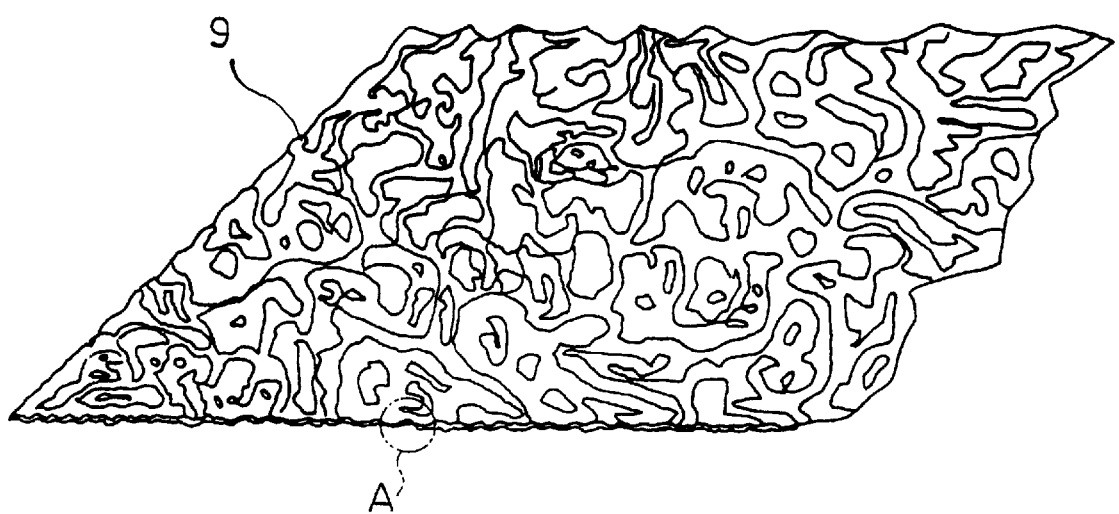
FIG. 5(a) is a perspective view showing a state of a bonding film surface.
Figure 5B:
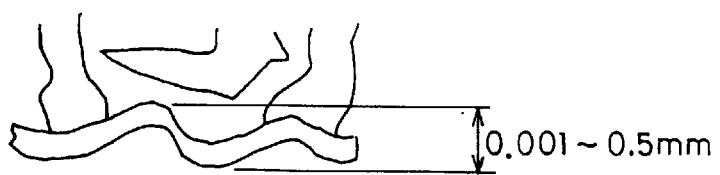
FIG. 5(b) is an enlarged perspective view of a portion A in FIG. 5(a)

FIG. 5(a) is a perspective view showing a surface condition of the bonding film 9, and FIG. 5(b) is a view showing an enlarged view of a portion A in FIG. 5(a). As shown in the drawings, the surface of the bonding film 9 is embossed.

Figure 6:
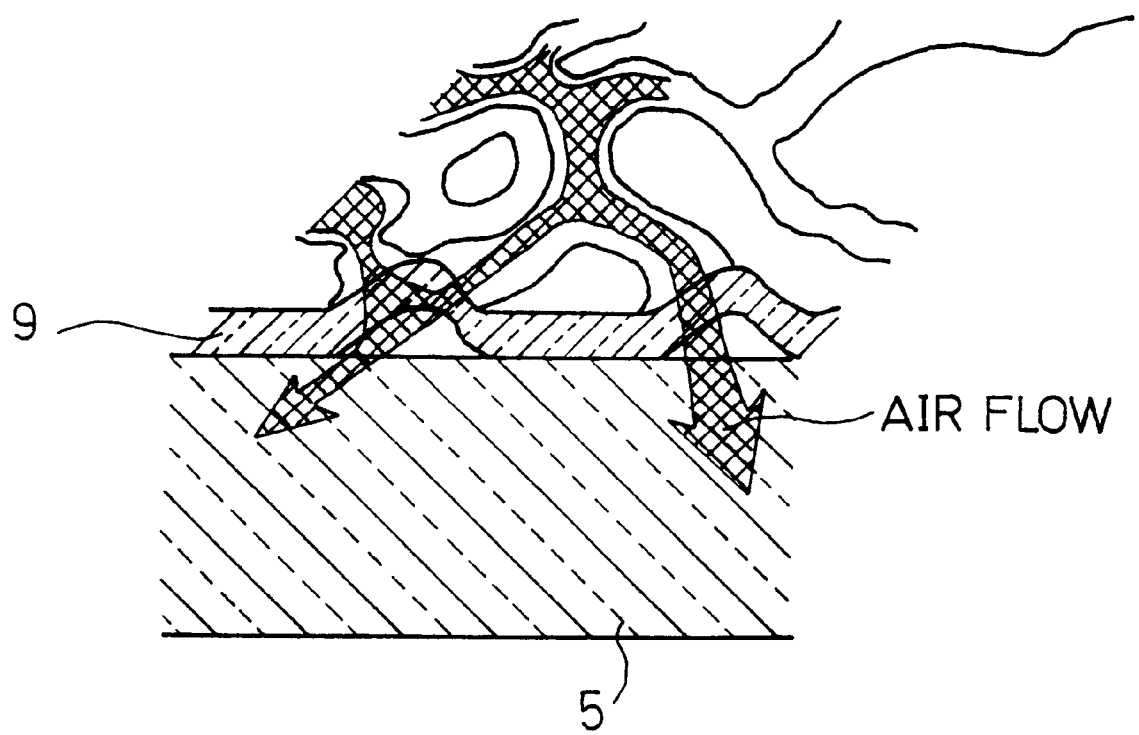
FIG. 6 is a perspective view showing how the air flows through a space secured between the bonding film and a CF substrate.

Accordingly, when the bonding film 9 is placed between the liquid crystal panels 2 and reinforced substrate 3, suitable spaced are secured between the bonding film 9 and liquid crystal panels 2 and between the bonding film 9 and reinforced substrate 3. The irregularity on the surface of the bonding film 9 before the vacuum heat-pressing is in a range between 0.001–0.5 mm. As shown in FIG. 6, bubbles (air) trapped during the vacuum heat-pressing flow through the above-mentioned spaces and are released to the outside of the CF substrate 5 and further to the outside of the liquid crystal panel 2. In other words, each of the above-mentioned spaces serves as a path for releasing the trapped bubbles to the outside. Consequently, bubbles are hardly trapped under the bonding surface during the vacuum heat-pressing.

As has been explained, arranging the surface condition of the bonding film 9 placed between the liquid crystal panels 2 and reinforced substrate 3 can secure a path through which the bubbles are released. Thus, if bubbles are trapped under the bonding surface during the vacuum heat-pressing, the bubbles are released to the outside through the path. Therefore, even if the liquid crystal panels 2 and reinforced substrate 3 have large areas, the pressure in a space therebetween can be reduced evenly. Consequently, an even bonding surface trapping substantially no bubbles underneath can be obtained.

Here, how readily the bubbles are trapped at different degrees of vacuum during the vacuum heat-pressing is evaluated, and the result of which is set forth in Table 2 below.

TABLE 2

| DEGREE OF VACUUM (torr) | READINESS |
| --- | --- |
| $3 \times 10^2$ | x |
| $1 \times 10^2$ | ○ |
| $3 \times 10^1$ | ◉ |
| $1 \times 10^1$ | ○ |
| $3 \times 10^0$ | ○ |
| $1 \times 10^0$ | ○ |
| $3 \times 10^{-1}$ | x |
| $1 \times 10^{-1}$ | x |

◉: bubbles are hardly trapped
○: bubbles are trapped at negligible level
X: bubbles are trapped considerably The evaluation reveals that a degree of vacuum during the vacuum heat-pressing is preferably in a range between 1–100 torr, and more preferably 30 torr.

In general, two glass substrates serving as the liquid crystal panels 2 and the reinforced substrate 3 have somewhat irregular, but smooth surfaces. This is because each substrate has different thickness. For example, typical glass substrates serving as a liquid crystal panel has a thickness difference of 30 μm at maximum.

Thus, if the bonding film 9 placed between the liquid crystal panels 2 and reinforced substrate 3 is too thin (for example, the bonding film 9 is 30 μm thick or less), the liquid crystal panels 2 and reinforced substrate 3 can not be bonded to each other uniformly. Moreover, there may be a case that the bonding film 9 is separated from the liquid crystal panels 2 or reinforced substrate 3.

However, an experiment reveals that when the bonding film 9 is 100 μm thick or greater, the bonding film 9 absorbs the irregularities of the surfaces of the substrates so as not to be separated from the liquid crystal panels 2 or reinforced substrate 3, and can obtain a uniform bonding property.

Figure 7:
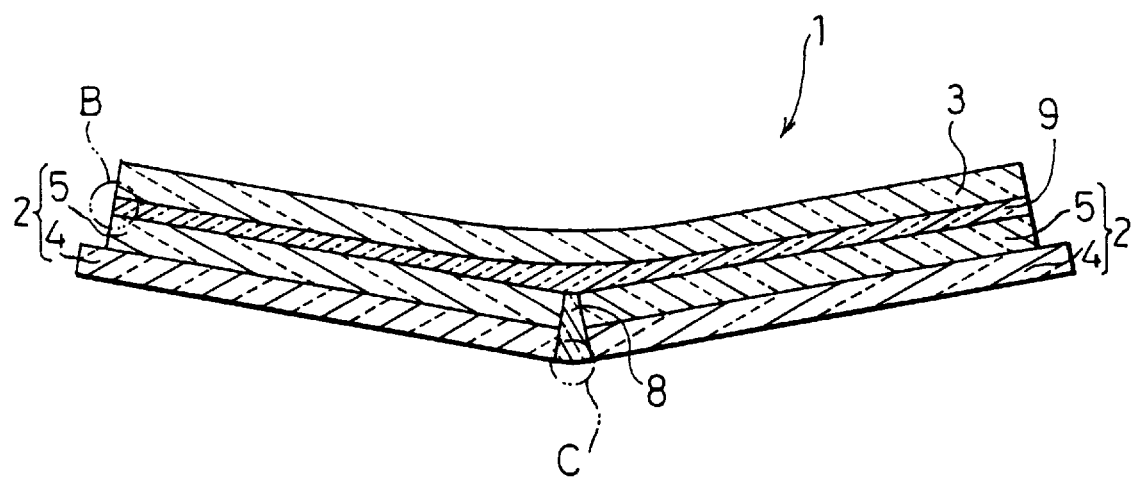
FIG. 7 is a cross section showing a state that the above liquid crystal display device is bent.

FIG. 7 is a cross section showing when the liquid crystal display device 1 is bent. Contrarily to the above case, if the bonding film 9 is too thick, a crack occurs in the joint of the liquid crystal panels 2, or film 9 is separated at the periphery of the reinforced substrate 3 when the liquid crystal display device 1 is bent. In the drawing, a portion indicated by a capital letter B is where the bonding film 9 is separated most easily, and a portion indicated by a capital letter C is where the crack occurs most frequently.

The defects occurred when the liquid crystal display device 1 is bent is set forth in Table 3 below.

TABLE 3

| THICKNESS OF FILM 9 (μm) | DEFECTS OCCURRED |
| --- | --- |
| 50 | PARTIAL SEPARATION OF FILM 9 |
| 100 | NONE |
| 200 | NONE |
| 300 | NONE |
| 400 | NONE |
| 500 | NONE |
| 600 | CRACK IN JOINT OF PANELS 2 |
| 700 | CRACK IN JOINT OF PANELS 2 SEPARATION OF FILM 9 AT PERIPHERAL OF SUBSTRATE 3 |

Table 3 reveals that when the bonding film 9 is more than 500 μm thick, a crack occurs in the bonding agent 8 between the liquid crystal panels 2 or the bonding film 9 is separated at the periphery of the reinforced substrate 3. The reason why this happens is presumably because the bonding film 9 has a lower hardness than glass, and when the liquid crystal display device 1 is bent, the reinforced substrate 3 can no longer reinforce the liquid crystal panels 2.

In view of the foregoing, when the thickness of the bonding film 9 is in a range between 100 μm and 500 μm inclusive, the liquid crystal panels 2 can be bonded to the reinforced substrate 3 in a relatively uniform manner through the bonding film 9. When the bonding film 9 has a thickness in the aforementioned range, the liquid crystal panels 2 are reinforced by the reinforced substrate 3 in a secure manner. Consequently, if the bonding film 9 has a thickness in the above range, the occurrence of the above-mentioned defect can be prevented.

In the present embodiment, the UV-set bonding agent 8 is used to connect the liquid crystal panels 2 to each other adjacently to manufacture the liquid crystal display device 1. However, the same effect can be attained if the bonding film 9 is used instead of the bonding agent 8. In this case, the bonding film 9 is processed into a shape of ribbon and placed between the liquid crystal panels 2, and both the bonding film 9 and liquid crystal panels 2 are heat-pressed, whereby the liquid crystal panels 2 are connected to each other. Note that, however, the bonding film 9 must have the same refractive index as the refractive index of the glass substrates serving as the liquid crystal panels 2.

Incidentally, the bonding film 9 is soft and easy to wrinkle, and for this and other reasons, the bonding film 9 may be difficult to handle before the vacuum heat-pressing.

Figure 8:
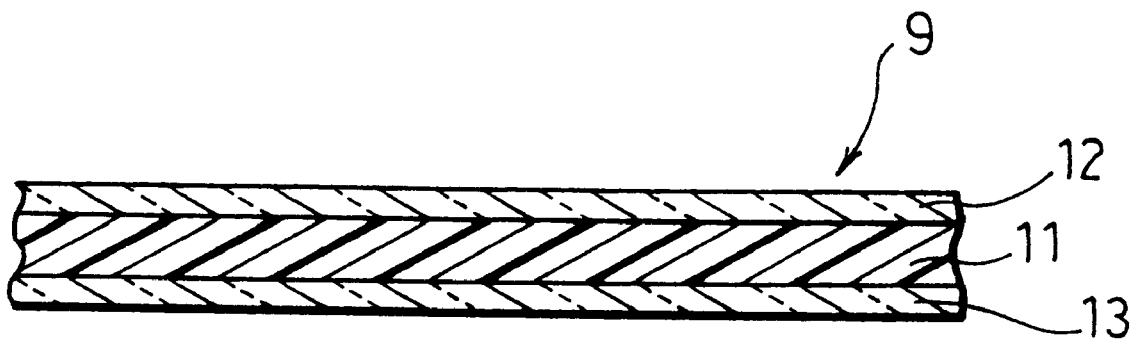
FIG. 8 is a cross section showing another example arrangement of the bonding film.

To solve this problem, as shown in FIG. 8, a base film 11, to which bonding films 12 and 13 (main surface side bonding film and rear surface side bonding film) are laminated respectively over the main and rear surfaces, may be used as a single sheet of the bonding film 9. In this case, the most preferred as the base film 11 is poly-methyl methacrylate (PMMA). The bonding films 12 and 13 may be made of the same material as the bonding film 9.

Embodiment 2

Figure 9:
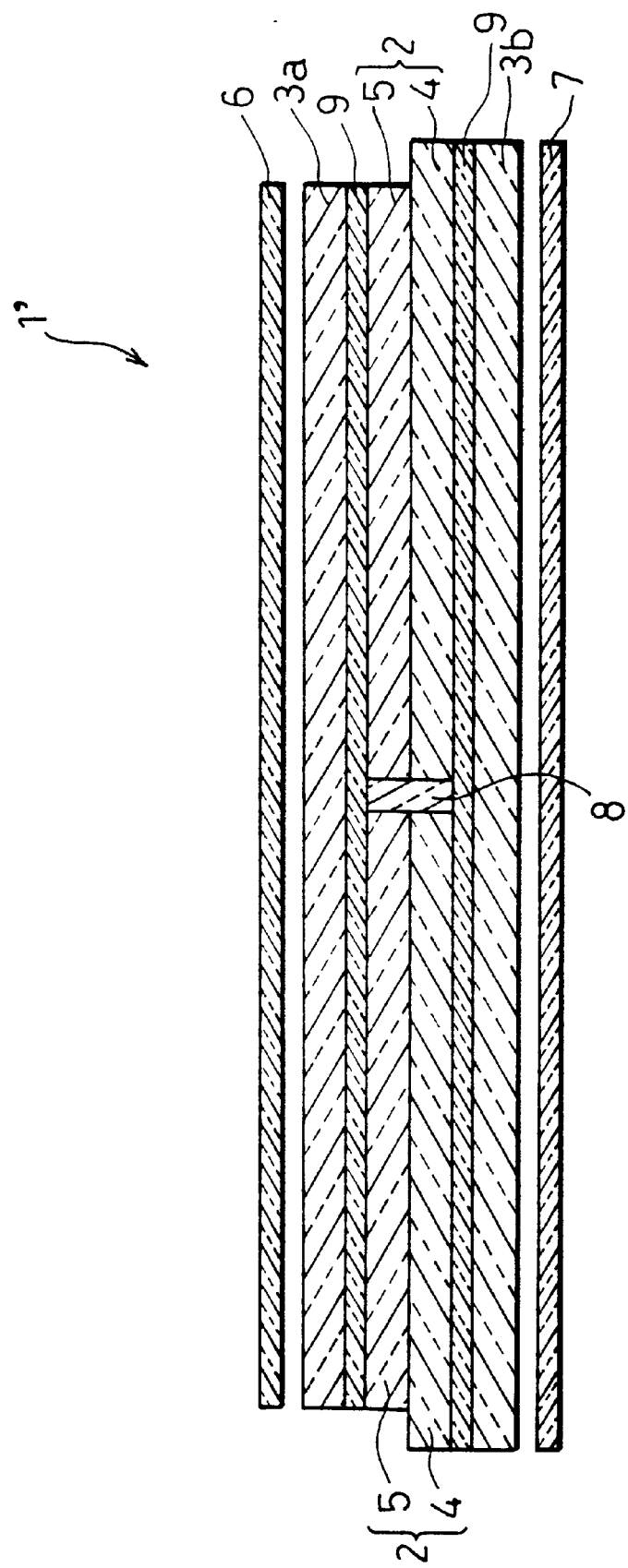
FIG. 9 is a cross section showing another example arrangement of the liquid crystal display device of the present invention.
Figure 10:
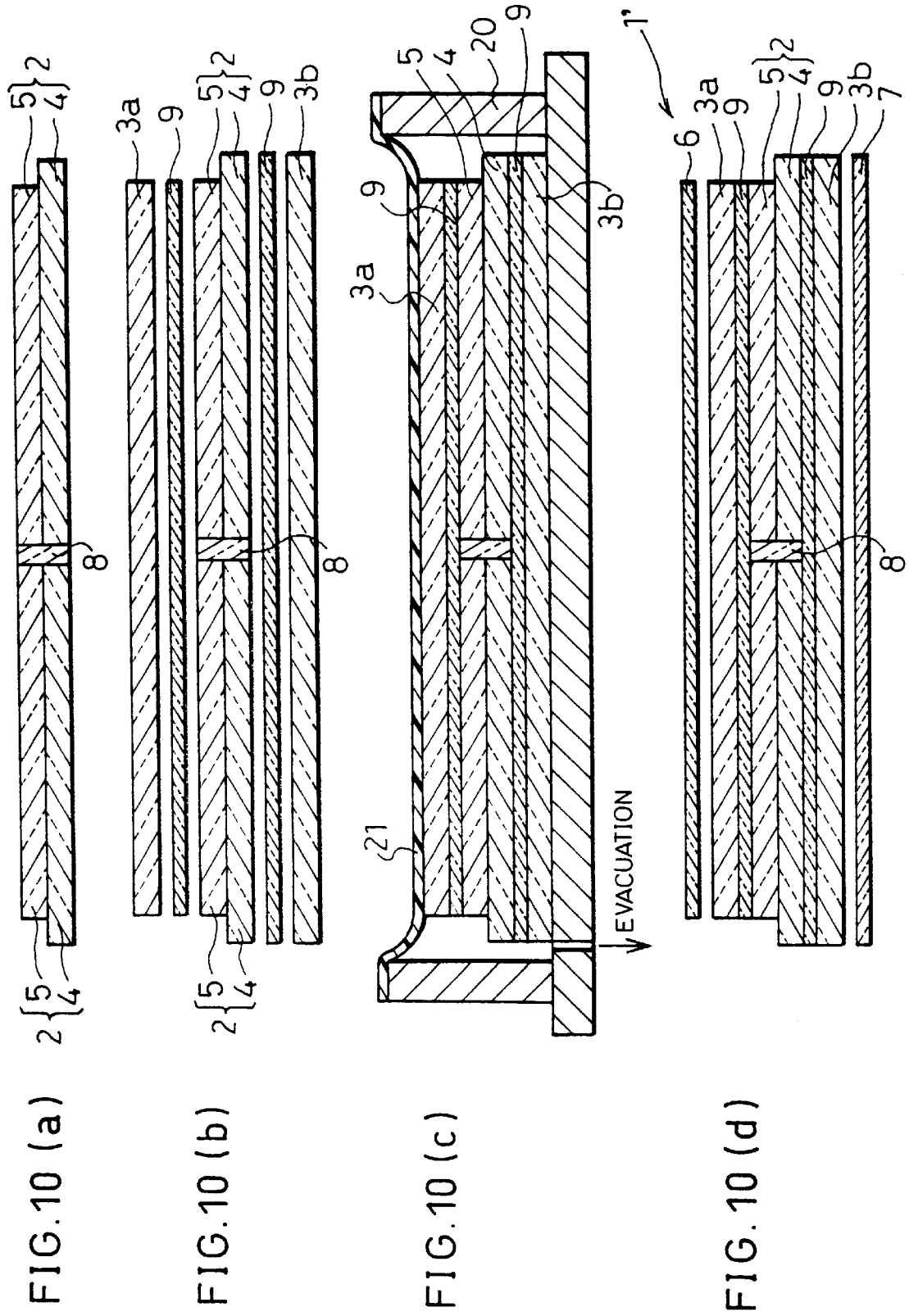
FIG. 10(a) through 10(d) are cross sections showing a manufacturing process of the above liquid crystal display device.

Referring to FIGS. 9 and 10, the following description will describe another example embodiment of the present invention. Described in the present embodiment are a direct-view-type liquid crystal display device 1', in which a top reinforced substrate 3a and a bottom reinforced substrate 3b are provided respectively to the main and rear surfaces of each liquid crystal panel 2, and a manufacturing method of the same. Hereinafter, like components are labeled with like reference numerals with respect to Embodiment 1, and the description of these components is not repeated for the explanation's convenience.

FIG. 9 is a cross section showing a schematic arrangement of the liquid crystal display device 1' of the present embodiment. The liquid crystal display device 1' actually includes a plurality of active matrix type liquid crystal panels 2; however, assume that the liquid crystal 1' includes two liquid crystal panels 2 herein for the explanation's convenience. Each liquid crystal panel 2 includes the TFT substrate 4 and CF substrate 5.

The liquid crystal panels 2 are connected to each other with the bonding agent 8 serving as a refractive index adjusting agent. The large top reinforced substrate 3a is laminated to the main surfaces (upper half side in the drawing) of the liquid crystal panels 2 through the bonding film 9. On the other hand, the large bottom reinforced substrate 3b is laminated to the rear surfaces (lower half side in the drawing) of the liquid crystal panels 2 through the bonding film 9. In other words, the reinforced substrates 3a and 3b are laminated to the liquid crystal panels 2, so that the liquid crystal panels 2 are connected to each other adjacently on the same plane. The liquid crystal panels 2 are sandwiched by the two reinforced substrates, namely, the top reinforced substrate 3a and bottom reinforced substrate 3b, through the bonding film 9. Both the top reinforced substrate 3a and bottom reinforced substrate 3b are glass substrates having substantially the same thermal expansion coefficient as the thermal expansion coefficient of the liquid crystal panels 2. Note that the bonding agent 8 and bonding film 9 are same as their respective counterparts in Embodiment 1.

The polarizing plate (polarizer) 6 is provided on the outer surface of the top reinforced substrate 3a almost entirely. Likewise, the polarizing plate (polarizer) 7 is provided on the outer surface of the bottom reinforced substrate 3b almost entirely. Here, the polarizing axes of the polarizing plates 6 and 7 intersect with each other at right angles.

Although it is not illustrated in the drawing, a back-light composed of a cold cathode tube or the like is provided in the outer surface side of the polarizing plate 7, namely, behind the liquid crystal display device 1' (lower half side in the drawing), and a driver for controlling an image signal is connected to each liquid crystal panel 2. Each liquid crystal panel 2 modulates light emanated from the back-light in accordance with image information to enable the observer to see the image information inputted therein.

Next, a manufacturing method of the liquid crystal display device 1' of the present embodiment will be explained. FIGS. 10(a) through 10(d) are cross sections showing the manufacturing process of the liquid crystal display device 1'.

As shown in FIG. 10(a), to begin with, two active matrix type liquid crystal panels 2 are prepared. Then, the liquid crystal panels 2 are connected to each other at their opposing end surfaces with the bonding agent 8, which is, for example, a UV-set bonding agent. The bonding agent 8 has the same refractive index as the refractive index of the two glass substrates serving as the TFT substrate 4 and CF substrate 5, respectively. The pixels are aligned on the liquid crystal panels 2 connected to each other adjacently in the conventional manner as is illustrated in FIG. 11.

When the bubbles are trapped in the bonding agent 8 between the liquid crystal panels 2 at this point, light reflects at the interface between the bubbles and bonding agent 8, thereby making the joint of the liquid crystal panels 2 noticeable. However, this problem can be eliminated easily by wiping off the bonding agent 8 with a solvent before the bonding agent 8 is set.

Then, as shown in FIG. 10(b), the bonding film 9 is placed between the liquid crystal panels 2 and top reinforced substrate 3a. The bonding film 9 is also placed between the liquid crystal panels 2 and bottom reinforced substrate 3b. Like in Embodiment 1, the bonding film 9 is a film mainly made of a partially saponified or denatured partially saponified copolymer of ethylene-vinyl acetate (EVA) or polyvinylbutyral (PVB). The bonding film 9 and each of the reinforced substrates 3a and 3b are substantially of the same size.

Then, as shown in FIG. 10(c), the work assembled in the step of FIG. 10(b) is set in the vacuum (decompress) pressing device 20 having the film 21. Then, the vacuum heat-pressing is carried by reducing the pressure inside the vacuum (decompress) pressing device 20 to 1–100 torr, or preferably to 30 torr, to heat the work for 30 minutes at 95° C. The work can be heated easily if the vacuum (decompressing) press apparatus 20 is set in an oven or the like. Alternatively, the work can be also heated easily if a heater is implanted in the framework inside the vacuum (decompress) pressing apparatus 20. Using the vacuum (decompress) pressing apparatus 20 makes it possible to laminate the top reinforced substrate 3a and bottom reinforced substrate 3b to the liquid crystal panels 2 without trapping bubbles under the bonding surface.

Then, as shown in FIG. 4(d), the work is taken out from the vacuum (decompress) pressing device 20. The polarizing plate 6 is provided to the outer surface of the top reinforced substrate 3a almost entirely, and the polarizing plate 7 is provided to the outer surface of the bottom reinforced substrate 3b almost entirely, whereby the liquid crystal display device 1' is assembled.

As has been explained, the liquid crystal panels 2 are sandwiched by the two reinforced substrates (top reinforced substrate 3a and bottom reinforced substrate 3b) through the bonding films 9. Accordingly, the strength of the liquid crystal panels 2 is upgraded, and so is the strength of liquid crystal display device 1'.

In other words, when a plurality of the liquid crystal panels 2 are laminated to the single reinforced substrate 3, the strength, particularly at the joint between the adjacent liquid crystal panels 2, is not good enough. This is because the bonding area at the end surface of each liquid crystal panel 2 is very small. Therefore, when the liquid crystal panels 2 or liquid crystal display device 1' is bent, a crack or the like readily occurs at the joint.

However, in the present embodiment, since the liquid crystal panels 2 are sandwiched by the two reinforced substrate (top reinforced substrate 3a and bottom reinforced substrate 3b), the strength, particularly at the joint, can be upgraded. This is very effective when assembling the liquid crystal display device 1' adopting the multi-panel display method with a large screen composed of a plurality of liquid crystal panels 2 connected to one another. Thus, according to the above arrangement, compared with the liquid crystal display device 1 of Embodiment 1, an extra reinforced substrate can prevent the occurrence of defects at the joint more effectively. Consequently, a non-defective ratio of the device can be further improved.

Also, according to the above arrangement, both the main and rear surface of the joint are covered with the top reinforced substrate 3a and bottom reinforced substrate 3b, respectively. This arrangement makes it possible not to expose the connection between the liquid crystal panels 2. Consequently, the liquid crystal display device 1' with higher display quality can be obtained.

As has been explained, the liquid crystal display device of the present invention is preferably further characterized in that a plurality of liquid crystal panels are sandwiched by two reinforced substrates through bonding films.

According to the above arrangement, the liquid crystal panels are sandwiched by the two reinforced substrates through the bonding films. Thus, not only the strength of the liquid crystal panels, but also the strength of the liquid crystal display device can be upgraded.

In other words, when the liquid crystal panels are laminated to a single reinforced substrate, the strength, particularly at the joints of the liquid crystal panels, is not good enough. This is because the bonding area in the end surface of each liquid crystal panel is very small. Thus, when the liquid panel or liquid crystal display device is bent for some reason, a crack or the like readily occurs at the joints.

However, when the liquid crystal panels are sandwiched by two reinforced substrates, the strength, particularly at the joints, can be upgraded. Thus, according to the above arrangement, it has become possible to suppress the occurrence of defects at the joints. Consequently, a non-defective ratio of the device can be improved.

Also, according to the above arrangement, both the main and rear surfaces of the joints are covered respectively with the two reinforced substrates, thereby preventing the connection between the liquid crystal panels being exposed. Consequently, it has become possible to obtain a liquid crystal display device with higher display quality.

The liquid crystal display device of the present invention is preferably further characterized in that the bonding film has a characteristic to have the retardation of 17 nm or less.

According to the above arrangement, since the bonding film has a characteristic to have the retardation of 17 nm or less, the polarizing characteristics of light passing through the bonding film is not deteriorated considerably. Thus, according to the above arrangement, the display characteristics of the liquid crystal display device can be upgraded.

The liquid crystal display device of the present invention is preferably further characterized in that the bonding film is a film mainly made of a partially saponified or denatured partially saponified copolymer of ethylene-vinyl acetate.

According to the above arrangement, the bonding film is a film mainly made of a partially saponified or denatured partially saponified copolymer of ethylene-vinyl acetate. In this case, the liquid crystal panels are laminated to the reinforced substrate at a relatively low temperature of 90–100° C. through the bonding film by, for example, vacuum heat-pressing. Thus, according to the above arrangement, not only a satisfactory bonding property can be obtained, but also the liquid crystal panel can excel the others relatively in terms of reliability.

The liquid crystal display device of the present invention is preferably further characterized in that the bonding film is a film mainly made of polyvinylbutyral.

According to the above arrangement, the bonding film is a film mainly made of polyvinylbutyral. Since polyvinylbutyral is a non-crystal polymer, the same has a small retardation of 17 nm or less. Thus, according to the above arrangement, the polarizing characteristics of light passing through the bonding film are not deteriorated considerably, thereby making it possible to obtain satisfactory display characteristics.

The liquid crystal display device of the present invention is preferably further characterized in that the bonding film has a thickness in a range between 100 $\mu$m and 500 $\mu$m inclusive.

According to the above arrangement, the bonding film has a thickness in a range between 100 $\mu$m and 500 $\mu$m inclusive.

Thus, the bonding film is not separated from the liquid crystal panels or reinforced substrate, or a crack does not occur at the joint of the liquid crystal panels connected adjacently when the liquid crystal display device is bent.

In other words, if the bonding film is 100 $\mu$m thick or less, the following problem occurs. That is, the bonding film is too thin to be bonded to the liquid crystal panels or reinforced substrate. Consequently, the bonding film is separated from the liquid crystal panels or reinforced substrate.

On the other hand, if the bonding film is 500 $\mu$m thick or more, the following problem occurs. That is, a crack occurs at the joint of the liquid crystal panels connected adjacently or the bonding film is separated from the periphery of the reinforced substrate when the liquid crystal display device is bent. The reason why this happens is presumably because the bonding film has a lower hardness than glass, and when the liquid crystal display device is bent, the reinforced substrate can no longer reinforce the liquid crystal panels.

Also, the liquid crystal panels and reinforced substrate have some irregularities on their respective surfaces to be pressed against the bonding film. However, if the bonding film has a thickness in a range between 100 $\mu$m and 500 $\mu$m inclusive, the bonding film can absorb the irregularities in a reliable manner. Consequently, the liquid crystal panels are bonded to the reinforced substrate in a relatively uniform manner through the bonding film. If the bonding film has a thickness in the aforementioned range, the liquid crystal panels are reinforced by the reinforced substrate in a reliable manner, thereby making it possible to eliminate the aforementioned inconveniences.

The manufacturing method of the liquid crystal display device of the present invention is preferably characterized in that the first step is a step of connecting a plurality of liquid crystal panels to one another at their respective end surfaces with a bonding agent, followed by placing a bonding film, which has a size substantially as large as the bonding areas of the liquid crystal panels and reinforced substrate, between the liquid crystal panels and reinforced substrate.

According to the above arrangement, the liquid crystal panels are connected to one another at their respective end surfaces with the bonding agent, after which the bonding film is placed between the liquid crystal panels and reinforced substrate. Accordingly, even if bubbles are trapped in the bonding agent while the liquid crystal panels are being connected, or a defect like a crack occurs at a part of the joint, the defective portion can be corrected easily before the bonding film is placed. Thus, according to the above arrangement, the defective portion can be corrected efficiently.

The manufacturing method of the liquid crystal display device of the present invention is preferably further characterized in that the second step is a step of heat-pressing the liquid crystal panels to the reinforced substrate under a vacuum or decompressing condition, so that the liquid crystal panels are connected to one another adjacently and placed on the same plane.

According to the above arrangement, since the liquid crystal panels are heat-pressed to the reinforced substrate under a vacuum or decompressing condition, air pressure is always applied to the liquid crystal panels. Thus, the liquid crystal panels are bonded to the reinforced substrate while being fixed at a predetermined cell gap. Consequently, the cell gap of the liquid crystal panels does not vary as does in the conventional method. Thus, according to the above arrangement, a uniform cell gap of the liquid crystal panels can be maintained, and the liquid crystal display device having satisfactory display characteristics can be obtained.

The manufacturing method of the liquid crystal display device of the present invention is preferably further characterized in that the liquid crystal panels are heat-pressed to the reinforced substrate in an atmosphere of 1–100 torr.

According to the above arrangement, the liquid crystal panels are heat-pressed to the reinforced substrate in an atmosphere of 1–100 torr. Accordingly, the bubbles are not trapped under the bonding surfaces of the liquid crystal panels and reinforced substrate. Thus, according to the above arrangement, it has become possible to bond a plurality of liquid crystal panels to the reinforced substrate evenly.

The manufacturing method of the liquid crystal display device of the present invention is characterized in that the bonding film has an embossed surface before being heat-pressed.

According to the above arrangement, since the bonding film has an embossed surface before being heat-pressed, a path is secured, so that the bubbles trapped under the bonding surface can be released through the same. Therefore, even if the bubbles are trapped under the bonding surface before the liquid crystal panels are heat-pressed to the reinforced substrate, the trapped bubbles can be released to the outside through the path thus secured. Thus, according to the above arrangement, even if the liquid crystal panels and reinforced substrate have large areas, the pressure inside a space therebetween can be reduced evenly. Consequently, a uniform bonding surface trapping substantially no bubbles underneath can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
    a plurality of liquid crystal panels;
    at least one reinforced substrate to which said liquid crystal panels are laminated to be connected to one another adjacently on a same plane;
    a bonding agent for connecting adjacent liquid crystal panels to each other at end surfaces, and
    at least one solid bonding film located between said liquid crystal panels and said at least one reinforced substrate, said solid bonding film being formed of a thermoplastic material that adheres said liquid crystal panels to said at least one reinforced substrate when heated.

2. The liquid crystal display device of claim 1, wherein said liquid crystal panels are sandwiched by two reinforced substrates through the at least one thermoplastic bonding film.

3. The liquid crystal display device of claim 1, wherein said at least one thermoplastic bonding film is made of a thermoplastic polymer.

4. The liquid crystal display device of claim 1, wherein said at least one thermoplastic bonding film is made of a non-crystal polymer.

5. The liquid crystal display device of claim 1, wherein said at least one thermoplastic bonding film has a characteristic to have retardation of 17 nm or less.

6. The liquid crystal display device of claim 1, wherein said at least one thermoplastic bonding film is a film mainly made of one of a partially saponified copolymer and a denatured partially saponified copolymer of ethylene-vinyl acetate.

7. The liquid crystal display device of claim 1, wherein said at least one thermoplastic bonding film is a film mainly made of polyvinylbutyral.

8. The liquid crystal display device of claim 1, wherein said at least one thermoplastic bonding film has an embossed surface.

9. The liquid crystal display device of claim 1, wherein said at least one thermoplastic bonding film has a thickness in a range between 100 $\mu$ and 500 $\mu$m inclusive.

10. The liquid crystal display device of claim 1, wherein said at least one thermoplastic bonding film has an area as large as areas of bonding surfaces of said liquid crystal panels and reinforced substrate.

11. The liquid crystal display device of claim 1, wherein said at least one thermoplastic bonding film is made of a base film, to which a main surface bonding film and a rear surface bonding film are laminated over a main surface and a rear surface, respectively.

12. The liquid crystal display device of claim 11, wherein said base film is made of poly-methyl methacrylate.

13. The liquid crystal display device of claim 1 further comprising a bonding agent for connecting adjacent liquid crystal panels at their respective end surfaces, said bonding agent being a UV-set bonding agent.

14. The liquid crystal display device of claim 13, wherein said bonding agent has a same refractive index as a refractive index of a substrate forming said each liquid crystal panel.

15. The liquid crystal display device of claim 13, wherein let n be the refractive index of the substrate forming said each liquid crystal panel, then said bonding agent has a refractive index of n±0.01n.

16. A manufacturing method of a liquid crystal display device comprising:
    a first step of placing at least one solid thermoplastic bonding film between a plurality of liquid crystal panels and a reinforced substrate, said at least one thermoplastic bonding film having a size as large as bonding areas of said liquid crystal panels and reinforced substrate; and
    a second step of heat-pressing said liquid crystal panels to said reinforced substrate, so that said liquid crystal panels are connected to one another adjacently and placed on a same plane.

17. The manufacturing method of a liquid crystal display device of claim 16, wherein, in said second step, said liquid crystal panels are heat-pressed to said reinforced substrate under one of a vacuum condition and a decompressing condition, so that said liquid crystal panels are connected to one another adjacently and placed on the same plane.

18. A manufacturing method of a liquid crystal display device comprising:
    a first step of placing a bonding film between a plurality of liquid crystal panels and a reinforced substrate, said bonding film having a size as large as bonding areas of said liquid crystal panels and reinforced substrate: and
    a second step of heat-pressing said liquid crystal panels to said reinforced substrate, so that said liquid crystal panels are connected to one another adjacently and placed on a same plane wherein heat-pressing in said second step is carried out in an atmosphere of 1–100 torr.

19. The manufacturing method of a liquid crystal display device of claim 18, wherein said bonding film has an embossed surface before being heat-pressed.

20. A manufacturing method of a liquid crystal display device comprising:
    a first step of placing a bonding film between a plurality of liquid crystal panels and a reinforced substrate, said bonding film having a size as large as bonding areas of said liquid crystal panels and reinforced substrate; and a second step of heat-pressing said liquid crystal panels to said reinforced substrate, so that said liquid crystal panels are connected to one another adjacently and placed on a same plane wherein heat-pressing in said second step is carried out in an atmosphere of 30 torr.

21. A manufacturing method of a liquid crystal display device comprising:

a first step of placing a bonding film between a plurality of liquid crystal panels and a reinforced substrate, said bonding film having a size as large as bonding areas of said liquid crystal panels and reinforced substrate; and a second step of heat-pressing said liquid crystal panels to said reinforced substrate, so that said liquid crystal panels are connected to one another adjacently and placed on a same plane wherein said bonding film is a crystalline polymer.

22. The manufacturing method of a liquid crystal display device of claim 21 further comprising a third step of cooling said bonding film after said second step.

23. The manufacturing method of a liquid crystal display device of claim 21, wherein said bonding film is a film mainly made of one of a partially saponified copolymer and a denatured partially saponified copolymer of ethylene-vinyl acetate.

24. A manufacturing method of a liquid crystal display device comprising:

a first step of placing a bonding film between a plurality of liquid crystal panels and a reinforced substrate, said bonding film having a size as large as bonding areas of said liquid crystal panels and reinforced substrate; and a second step of heat-pressing said liquid crystal panels to said reinforced substrate, so that said liquid crystal panels are connected to one another adjacently and placed on a same plane wherein said bonding film is a film mainly made of polyvinylbutyral.

* * * * *